(12) United States Patent
Chan et al.

(10) Patent No.: US 7,292,661 B1
(45) Date of Patent: Nov. 6, 2007

(54) BLOCK-ITERATIVE EQUALIZERS FOR DIGITAL COMMUNICATION SYSTEM

(75) Inventors: Albert M. Chan, Cambridge, MA (US); Gregory W. Wornell, Wellesly, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/528,678

(22) Filed: Mar. 20, 2000

(51) Int. Cl.
*H04B 1/10* (2006.01)

(52) U.S. Cl. ............... 375/346; 375/229; 375/230; 375/231; 375/232; 375/233; 375/234

(58) Field of Classification Search ........... 375/341, 375/346, 229–236, 148, 265, 340; 370/480, 370/206; 714/758, 795
See application file for complete search history.

(56) References Cited

U.S. PATENT DOCUMENTS

| | | | | |
|---|---|---|---|---|
| 5,052,000 A * | 9/1991 | Wang et al. | ............... | 714/758 |
| 5,297,166 A * | 3/1994 | Batruni | ............... | 375/233 |
| 5,471,504 A * | 11/1995 | Lee et al. | ............... | 375/233 |
| 5,761,237 A * | 6/1998 | Petersen et al. | ............... | 375/148 |
| 6,011,813 A * | 1/2000 | Ghosh | ............... | 375/233 |
| 6,012,161 A * | 1/2000 | Ariyavisitakul et al. | ............... | 714/795 |
| 6,115,419 A * | 9/2000 | Meehan | ............... | 375/233 |
| 6,151,358 A * | 11/2000 | Lee et al. | ............... | 375/232 |
| 6,226,323 B1 * | 5/2001 | Tan et al. | ............... | 375/233 |
| 6,236,645 B1 * | 5/2001 | Agazzi | ............... | 370/286 |
| 6,304,598 B1 * | 10/2001 | Agazzi et al. | ............... | 375/232 |
| 6,483,872 B2 * | 11/2002 | Nguyen | ............... | 375/231 |
| 6,570,919 B1 * | 5/2003 | Lee | ............... | 375/233 |
| 6,690,739 B1 * | 2/2004 | Mui | ............... | 375/265 |

OTHER PUBLICATIONS

Ariyavisitakul, "Joint Coding and Decision Feedback Equalization for Broadband Wireless Channels", IEEE Journal on Selected Areas in Communications, vol. 16, No. 9, Dec. 1998, pp. 1670-1678.*
"Iterative Interference Cancellation and Decoding For Spread-Signature CDMA Systems"; by Soosan Beheshti & Gregory W. Wornell; Research Laboratory of Electronics; Massachusetts Institute of Technology; Cambridge, MA 02139.
"Detection of Coded Modulation Signals on Linear, Severely Distorted Channels Using Decision-Feedback Noise Prediction With Interleaving"; by M. Vedat Eyuboglu; IEEE Transactions on Communications, vol. 36, No. 4, Apr. 1988; pp. 401-409.
"Decision-Feedback Equalization of Time-Dispersive Channels with Coded Modulation"; by Kefeng Zhou & John G. Proakis; IEEE Transactions on Communications, vol. 38, No. 1, Jan. 1990; pp. 18-24.

(Continued)

*Primary Examiner*—Curtis Odom
(74) *Attorney, Agent, or Firm*—Gauthier & Connors LLP

(57) ABSTRACT

A block-iterative equalizer is adapted for use in contemporary digital communication system receivers. In a preferred embodiment, data received over a communication channel is processed by a linear feed-forward filter and the resulting filtered signal is provided to a slicer which makes a first set of tentative symbol decisions. During later iterations, the same received data is processed by the linear feed-forward filter, the feed-forward filter parameters being modified at each iteration based on the received data and the tentative decisions are themselves filtered by a second, "feed-back" filter and used to improve the tentative decisions.

32 Claims, 4 Drawing Sheets

OTHER PUBLICATIONS

"Coded Reduced-Bandwidth Qam With Decision-Feedback Equalization"; by K. Zhou & J.G. Proakis; Department of Electrical and Computer Engineering; Northeastern University, Boston, MA 02115; 1988 IEEE; pp. 0380-0384.

"Maximum-Likelihood Sequence Estimation of Digital Sequences in the Presence of Intersymbol Interference"; by G. David Forney, Jr., IEEE Transactions on Information Theory, vol. IT-18, No. 3, May 1972; pp. 363-378.

"Trellis-Coded Modulation With Redundant Signal Sets: Part II: State of the Art" by Gottfried Ungerboeck; IEEE Communications Magazine; Feb. 987; vol. 25, No. 2; pp. 12-21.

"Trellis-Coded Modulation With Redundant Signal Sets Part 1: Introduction" by Gottfried Ungerboeck; IEEE Communications Magazine, Feb. 1987; vol. 25, No. 2; pp. 5-11.

"Efficient Signal Processing Techniques for Exploiting Transmit Antenna Diversity on Fading Channels" by Gregory W. Wornell and Mitchell D. Trott; IEEE Transactions on Signal Processing; vol. 45, No. 1, Jan. 1997; pp. 191-205.

"Near Shannon Limit Error Correcting Coding and Decoding: Turbo-Codes (1)" by Berrou et al.; IEEE 1993; pp. 1064-1070.

"Near Optimum Error Correcting Coding And Decoding: Turbo-Codes"; by Claude Berrou & Alain Gavieux; IEEE Transactions on Communications; vol. 44, No. 10; Oct. 1996; pp. 1261-1271.

"Channel Coding With Multilevel/Phase Signals" by Gottfried Ungerboeck; IEEE Transactions on Information Theory, vol. IT-28, No. 1, Jan. 1982; pp. 55-67.

Ariyavisitakul et al., "Joint Coding and Decision Feedback Equalization for Broadband Wireless Channels," *IEEE Journal on Selected Areas in Communications*, vol. 16, No. 9, Dec. 1988, pp. 1670-1678.

Chan et al., "A Class of Block-Iterative Equalizers for Intersymbol Interference Channels," *2000 IEEE Internatinal Conference on Communications*, vol. 1, Jun. 18-22, 2000, pp. 31-35.

Chan et al., "A New Class of Efficient Block-Iterative Interference Cancellation Techniques for Digital Communication Receivers," *Proc. Allerton Conf. Commun., Contr., Computing*, Oct. 2000, pp. 1-12.

Frank et al., "Efficient Equalization of Nonlinear Communication Channels," *IEEE International Conference on Acoustics, Speech, and Signal Processing*, vol. 3, Apr. 21-24, 1997, pp. 2501-2504.

Hwang et al., "Multiuser Detection Scheme for TDMA Mobile Systems Using Spatial Diversity and MMSE Decision-Feedback Receiver," *Proceedings of IEEE Tencon '99*, vol. 2, Sep. 15-17, 1999, pp. 1247-1250.

\* cited by examiner

BLOCK-ITERATIVE EQUALIZERS FOR DIGITAL COMMUNICATION SYSTEM

GOVERNMENT SUPPORT

The Government has rights in this invention pursuant to Contract Number N00014-96-1-0930, awarded by the Office of Naval Research.

FIELD OF THE INVENTION

The present invention relates to a novel class of equalizers for use in the receivers of digital communication systems.

BACKGROUND OF THE INVENTION

In the receiver of a contemporary digital communication system, an equalizer operates to compensate for various forms of distortion introduced by the propagation medium. In wireless communication systems for example, an important source of such distortion is time-varying multipath propagation, whereby the transmitted signal travels through multiple paths en route to the receiver due to reflections off objects in the propagation environment. In wireline communication, such as twisted copper wire pair or co-axial cable, such distortion arises due to the frequency response characteristics of the physical medium, referred to herein as the "channel", or of other system hardware in the network.

Absent some form of correction or compensation, such distortion can cause streams of transmitted bits or symbols to interfere with one another, a phenomenon generally referred to as intersymbol interference. In certain code-division multiple-access (CDMA) communication systems, distortion may further give rise to a phenomenon referred to as inter-chip interference. Intersymbol interference (ISI) is used herein to refer to both forms of interference. Precursor ISI is caused by the strictly anticausal portion of the equivalent discrete-time channel impulse response, whereby a current symbol affects symbols in the past. Postcursor ISI is caused by the stricly causal portion of the equivalent discrete-time channel impulse response, whereby a current symbol affects symbols in the future. ISI can lead to severe degradation in system performance, especially in wireless settings. Equalizers, designed to compensate for, and to mitigate the effects of, such interference, have been under development for more than three decades and have evolved to become essential components in virtually all modern communication systems.

It is well known in theory that receivers that realize maximum-likelihood sequence detection (MLSD) are asymptotically optimal in bit-error rate at high signal-to-noise ratios (SNR), as observed in G. D. Forney, Jr., "Maximum-likelihood sequence estimation of digital sequences in the presence of intersymbol interference," IEEE Trans. Inform. Theory, vol. IT-18, pp. 363-378, May 1972. However, even when implemented efficiently using the Viterbi algorithm, the computational requirements of such receivers are prohibitive for even small signal constellations and channels whose ISI spans only a modest number of symbols. Indeed, although the complexity of MLSD is independent of block-length, it does grow as $M^{L-1}$ where M is the size of the symbol alphabet and L is the length of the impulse response of the equivalent discrete-time channel. As a result, practical equalizers rarely employ MLSD.

Two approaches have become popular in practice: linear equalizers (LEs) and decision-feedback equalizers (DFEs). LEs were developed in the 1960's, and employed linear filters to compensate for distortion. Later, in the late 1960's and early 1970's, the inherently non-linear DFEs were introduced. In both cases, the computational complexity is dramatically lower than the theoretically superior MLSD approach—it is essentially independent of the size of the symbol alphabet M and proportional to the length of the channel impulse response L.

Like the LE, the DFE processes the received signal using a linear filter and makes symbol decisions using a slicer, as disclosed in C. A. Belfiore and J. H. Park, Jr., "Decision-feedback equalization," Proc. IEEE, vol. 67, pp. 1143-1156, August 1979. However, each time a decision is to be made, a linear, strictly causal filter forms a weighted linear combination of previous symbol decisions, assumed to be correct, to cancel the postcursor ISI at the slicer input. The slicer then generates a decision for the current symbol. Note that once a symbol decision is made, it does not change and is used to cancel postcursor ISI when making decisions for future symbols.

Another equalizer approach, referred to as the "ISI canceler", processes the received signal using a linear filter and makes symbol decisions using a slicer, as disclosed in Gersho and T. L. Lim, "Adaptive cancellation of intersymbol interference for data transmission," Bell Syst. Tech. J., vol. 60, pp. 1997-2021, November 1981. However, each time a decision is to be made, a linear noncausal filter forms a weighted linear combination of both previous and future tentative symbol decisions made by some other equalizer, typically a linear equalizer, to cancel ISI at the slicer input. The slicer then generates a final decision for the current symbol.

LEs are widely used, but often suffer from excessive noise enhancement, even when minimum mean-square error (MMSE) design criteria are used. DFEs are capable of better performance, particularly at higher SNR, because postcursor ISI is suppressed nonlinearly. However, noise enhancement is still an issue in DFEs because precursor ISI is only suppressed linearly, and the sequential structure of DFE algorithms make them generally incompatible with error-control channel coding due to decoding delay issues, despite numerous attempts to merge the two; see, for example, (a) J. G. Proakis, Digital Communications. New York, N.Y.: McGraw-Hill, 2nd ed., 1989. (b) V. M. Eyuboglu, "Detection of coded modulation signals on linear, severely distorted channels using decision-feedback noise prediction with interleaving," IEEE Trans. Commun., vol. COM-36, April 1988. (c) K. Zhou and J. G. Proakis, "Coded reduced-bandwidth QAM with decision-feedback equalization," in Proc. Int. Conf. Commun., pp. 12.6.1-12.6.5, June 1988. (d) K. Zhou, J. G. Proakis, and F. Ling, "Decision-feedback equalization of fading dispersive channels with trellis-coded modulation," in Proc. Int. Conf. Commun. Techn., November 1987. Since error-control coding is required to approach channel capacity, an equalizer compatible with this feature is highly desirable.

SUMMARY OF THE INVENTION

The present invention represents a major improvement over existing equalizers, and its advantages are the result of a fundamentally new equalizer architecture.

The novel class of equalizers presented herein are configured in a block-iterative structure, i.e., they are implemented by a multiple-pass algorithm. An illustrative example of the operation of the new class of equalizers is as follows. Let x[n] denote an uncoded transmitted symbol stream and r[n] denote a received data stream corresponding to the equivalent discrete-time baseband model. On the first pass, this received data is processed by a linear filter, and the resulting output is passed on to a slicer, which makes a first set of tentative symbol decisions $\hat{x}^1[n]$. This initial pass is then followed by a second pass in which the same received data is processed by a linear filter, and the tentative decisions made in the previous pass are used to construct and subtract out an estimate of the ISI. The ISI-reduced data is then passed on to the slicer, which makes a new second set of tentative decisions $\hat{x}^2[n]$. The process repeats in this manner, until adequately reliable decisions are obtained.

Unlike the conventional DFEs, the novel equalizers of the present invention suppress virtually all of the ISI, including precursor and postcursor ISI, in a nonlinear manner, significantly enhancing system performance. In fact, theory and simulations have demonstrated that the new class of equalizers can achieve a given level of reliability (as measured by bit-error rate) using significantly less received signal power than conventional equalizers.

Additionally, unlike the DFE, the equalizers of the present invention can be deployed in conjunction with systems employing error-control coding, making them attractive for channels operating near capacity.

A further advantageous feature of the equalizers of the present invention is extremely low computational complexity. The order of complexity is comparable to that of the DFE, and the adaptive implementation is much less computationally complex.

In a first embodiment, the present invention is directed to an apparatus and method for iteratively equalizing received data transmitted over a data channel in a data communication system. At each iteration, a first filter, for example a "feed-forward" filter, filters received data according to first filter parameters to generate first-filtered data. A combiner modifies the first-filtered data with second-filtered data to generate modified data. A decision device, for example a digital slicer generates modified tentative decisions based on the modified data, the modified tentative decisions being modified with respect to tentative decisions of a previous iteration. A second filter, for example a "feed-back" filter, filters tentative decisions from a previous iteration according to second filter parameters to generate said second-filtered data. The first and second filter parameters are based on the received data, and are preferably modified at each iteration.

In a preferred embodiment, the received data is sampled at a rate higher than a symbol rate associated with the received data. The received data may comprise symbol data.

The first and second parameters may be modified at each iteration according to channel parameters that are re-estimated at each iteration based on the received data.

The received data may optionally be encoded for error correction coding, in which case the decision device comprises an error-correction decoder, and wherein the equalizer further comprises an encoder for encoding the tentative decisions from a previous iteration.

The feed-forward and feed-back filters may comprise linear, non-linear, time-variant, time-invariant, infinite-impulse-response (IIR) and finite-impulse-response (FIR) types.

In alternative embodiments, the received data may comprise a plurality of received signals received over a plurality of data channels, in which case the equalizer further comprises a like plurality of first filters corresponding to the plurality of channels. The received data may further comprise combined data for a plurality of users, in which case the equalizer further comprises a like plurality of second filters corresponding to the plurality of users.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The present invention is directed to a novel equalizer system suitable for use in modern communication systems. A block-iterative configuration is employed to efficiently process received data, in a manner that is reliable and computationally inexpensive.

During each iteration, a set of tentative decisions are made as to the transmitted data, with the help of tentative decisions from a previous iteration. Reliability of the tentative decisions improves during each iteration, and therefore the tentative decisions from the previous iterations become more useful. The iterations continue until further iterations do not significantly change the set of tentative decisions.

Unlike conventional DFEs, the novel equalizers of the present invention suppress virtually all of the ISI, including precursor and postcursor ISI, in a nonlinear manner, significantly enhancing system performance. In fact, theory and simulations have demonstrated that the new class of equalizers can achieve a given level of reliability (as measured by bit-error rate) using significantly less received signal power than conventional equalizers. In particular, the new class of equalizers is capable of achieving a given bit error rate with 2.5 dB less received signal power as compared to a conventional system employing a minimum mean-square error DFE on severe ISI channels, even for uncoded systems.

Figure 1:
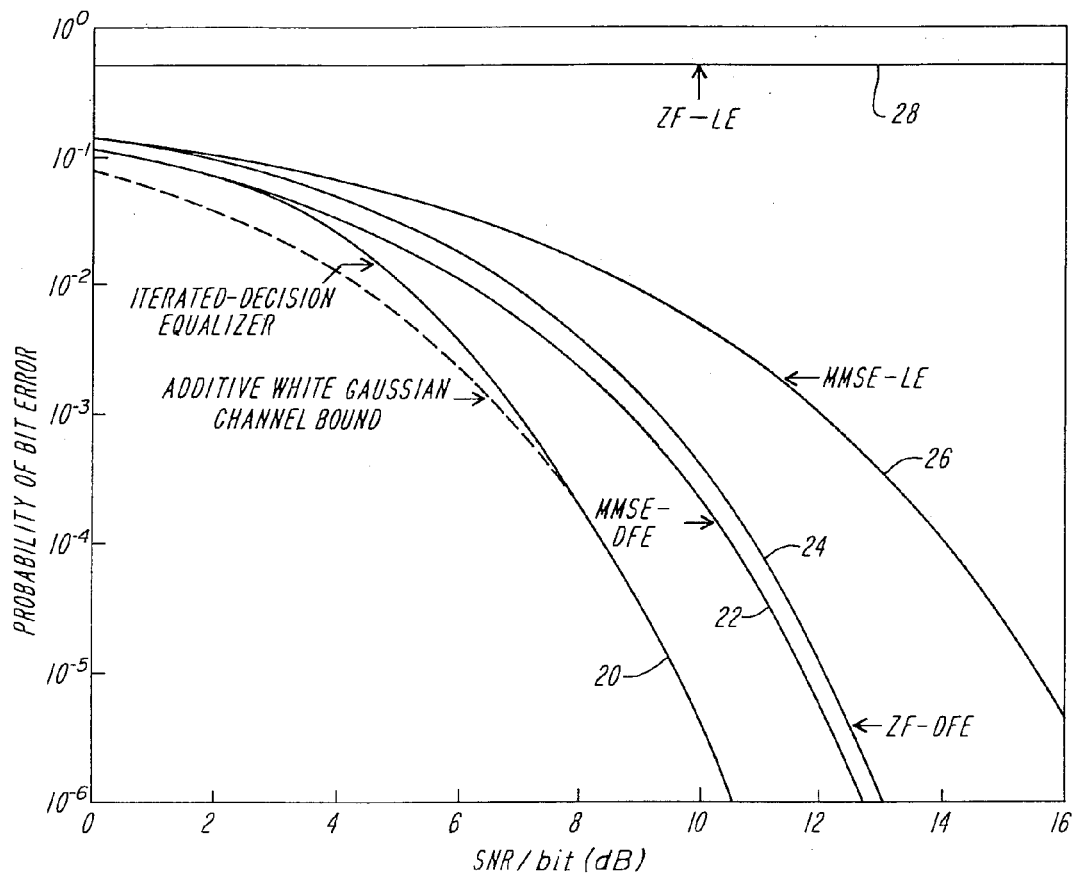
FIG. 1 is a graph comparing uncoded quadrature phase-shift keying (QPSK) performance predictions for the iterative equalizer of the present invention and various classical equalizers, based on asymptotic (long ISI) analysis.

As an example, FIG. 1 compares uncoded quadrature phase-shift keying (QPSK) performance predictions for the iterative equalizer of the present invention 20 with various classical equalizers, including the minimum mean-square error decision-feedback equalizer (MMSE-DFE) 22, the zero-forcing decision-feedback equalizer (ZF-DFE) 24, the minimum mean-square error linear equalizer (MMSE-LE) 26, and the zero-forcing linear equalizer (ZF-LE) 28, based on asymptotic (long ISI) analysis. The zero-forcing (ZF) technique selects the filters that completely eliminate ISI, usually at the expense of high noise enhancement. The minimum-mean-square-error (MMSE) technique, on the other hand, takes both into account, and attempts to minimize the combined effect of ISI and noise enhancement. It is noteworthy that the performance of the iterative equalizer of the present invention 20 approaches the additive white Gaussian channel bound, asypmtotically achieved by MLSD. When a channel introduces no intersymbol interference but only white Gaussian noise, equalization is not necessary. The receiver simply uses a symbol-by-symbol decision slicer and the bit-error rate achieved is known as the additive white Gaussian channel bound. When a channel introduces both intersymbol interference and white Gaussian noise, equalization is necessary. No matter what kind of equalization is used, one can never attain a lower bit-error rate than the additive white Gaussian channel bound at the same SNR. Receivers that use maximum-likelihood sequence detection (MLSD) are asymptotically optimal in the sense of minimizing bit-error rate at high SNR over channels that introduce intersymbol interference, and so it is expected that the bit-error rate in a receiver using MLSD approaches the additive white Gaussian channel bound at high SNR. In FIG. 1, the bit-error rate of the iterative equalizer of the present invention 20 approaches the additive white Gaussian bound at high SNR, which is asymptotically achieved by MLSD.

Figure 2:
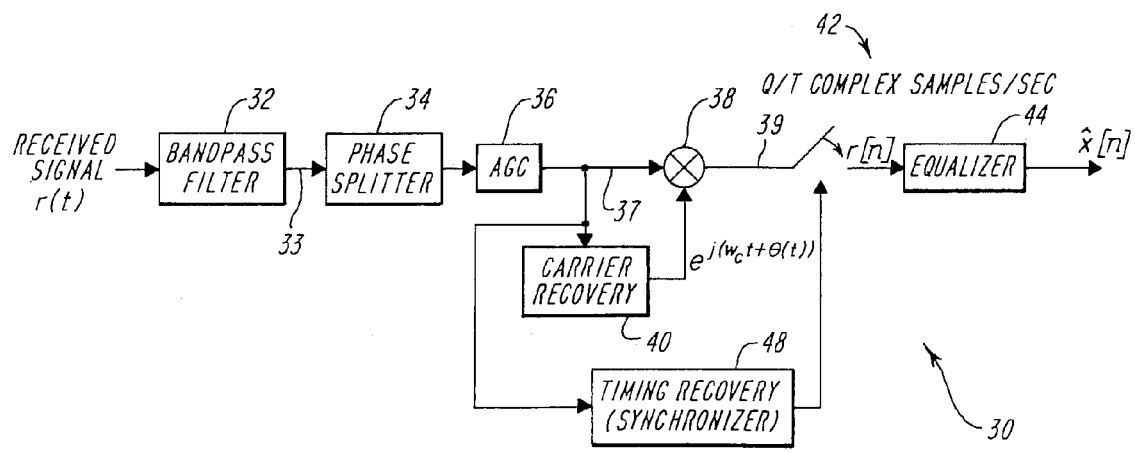
FIG. 2 is a block diagram of a data signal receiver configuration in accordance with the present invention.

FIG. 2 is a block diagram of a receiver system 30 for receiving digital pulse amplitude modulation (PAM) carrier-modulated data signals transmitted from a far-end transmitter (not shown) over a communication channel.

In the transmitter, a stream of binary data is typically mapped into a sequence x[n] of complex numbers selected from a discrete symbol set. Multiple bits may be mapped into a single data symbol. The sequence of symbols is then combined with the transmit pulse shape $P_{TF}(t)$ to produce the complex-valued continuous-time signal $$s(t) = \sum_{k} x[k] p_{TF}(t - kT),$$

where T is the modulation or baud interval. The real and imaginary components of s(t) amplitude-modulate in-phase and quadrature-phase carrier waves respectively, which combine to form the passband PAM signal transmitted to the receiver 30.

At the receiver 30, the received signal r(t) is applied to an input circuit comprising several components in series, the order of which may vary from system to system. Typically, the input circuit includes a bandpass filter 32 in order to suppress energy in the received signal r(t) outside the transmission frequency band. The filtered signal 33 is next processed by a phase splitter 34 that rejects negative frequencies and has two real-valued outputs representing a complex-valued signal. Alternatively, the functionality of the bandpass filter 32 and the phase splitter 34 can be replaced by an analytic passband filter, implemented using two physical filters, each with a real-valued output. An automatic gain control (AGC) 36 typically follows the passband filtering, which compensates for slow amplitude variations in the received signal caused by the channel. A demodulator 38 multiplies the complex-valued signal 37 by $e^{j(\omega_c t + \Theta(t))}$ where $\Theta(t)$ is determined by a separate carrier recovery circuit 40 to compensate for the effects of frequency offset and phase jitter. In one embodiment, the complex multiply can be implemented using four real multiplies and two real additions. Finally, an analog-to-digital (A/D) converter 42 samples the two real-valued signals 39 representing the complex-valued signal. In high-performance communication systems, the incoming analog received signal may by oversampled so that sensitivity to timing and synchronization is reduced. A receiver capable of receiving and processing such oversampled signals is referred to in the art as a "fractionally-spaced" receiver. Thus, samples can be generated at an integer multiple of the baud rate, i.e., at a rate of Q/T complex samples/sec, where Q is a positive integer. The baud rate is usually estimated in the receiver 30 by a separate timing recovery circuit 48. In this manner, complex samples r[n] are produced, with the index n advancing at a rate of Q/T complex samples/sec. The complex samples r[n] can be modelled as $$r[n] = \Sigma_k x[k] a[n-k] + w[n]$$

where a[n] is the equivalent discrete-time baseband model of the PAM communication system and where w[n] is additive noise. The demodulator function 38 may optionally follow the sampler 42 to allow the demodulator 38 to be implemented in discrete time rather than continuous time. Additionally, both carrier recovery and timing recovery may be decision directed, in which case feedback from the output of the receiver is needed. The received samples r[n] are next passed to an equalizer system 44 configured in accordance with the present invention.

The equalizer 44 processes the received data r[n] in a block-iterative fashion. Specifically, during each iteration or "pass", a linear filter processes the received data, and tentative decisions made during a previous iteration are used to construct and subtract out an estimate of the ISI. The resulting ISI-reduced data is then passed on to a slicer, which generates a new set of tentative decisions. With each successive iteration, increasingly refined hard decisions (i.e., decisions made by the slicer 58 of FIG. 3 below) are generated using this strategy.

Figure 3:
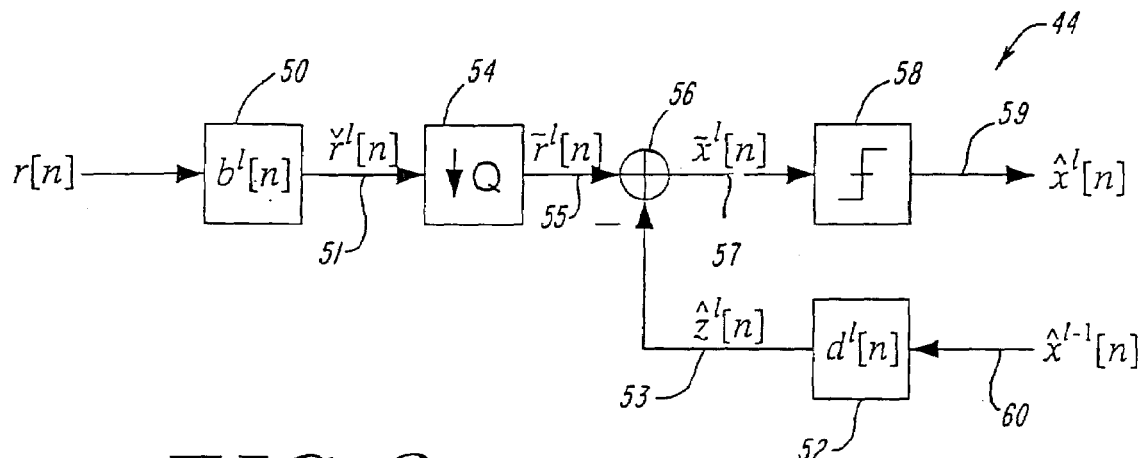
FIG. 3 is a block diagram of an equalizer system in accordance with the present invention.

FIG. 3 is a block diagram of an iterated-decision equalizer 44 in accordance with a preferred embodiment of the present invention. The parameters of all systems and signals associated with the l th pass are denoted using the superscript "l". On the l th pass of the equalizer 44, where l=1,2,3. . . , the received data r[n] is first processed by first filter $b^l[n]$ 50, referred to herein as a "feed-forward filter" (preferably in the form of a linear filter), producing the sequence:

$$\acute{r}^l[n] = \Sigma_k b^l[kP] r[n-kP]$$

where P and Q are preferably prime integers with P<Q. (If a symbol-spaced equalizer is to be implemented, then P=Q=1. If, however, a fractionally-spaced equalizer is to be implemented, then P=1 and Q=2 in most cases when there is not more than 100% excess bandwidth.) The output of a second filter, referred to herein as a "feed-back filter" $d^l[n]$ 52 and the input to a decision device, for example a slicer 58, are preferably both at the baud rate, so $\acute{r}^l[n]$ 51 is downsampled at downsampler 54 by a factor of Q to provide downsampled signal $\tilde{r}^l[n]$ 55. Next, an appropriately constructed estimate $\tilde{z}^l[n]$ 53 of the ISI is subtracted from downsampled signal $\tilde{r}^l[n]$ 55 at subtractor 56 to produce signal $\tilde{x}^l[n]$ 57, where $$\tilde{x}^l[n] = \tilde{r}^l[n] - \tilde{z}^l[n],$$

and where $$\tilde{z}^l[n] = \Sigma_k d^l[k] \hat{x}^{l-1}[n-k].$$

Since $\tilde{z}^l[n]$ is intended as an ISI estimate, the zero-delay tap of the feedback filter $d^l[n]$ 52 is set at zero. The slicer 58 then generates the new set of hard decisions $\hat{x}^l[n]$ 59 from $\tilde{x}^l[n]$ using, for example, the well-known minimum-distance rule.

Note that alternative functions are equally applicable to the present invention. For example, the subtractor 56 may comprise an adder or other means for combining the filtered signals from the feed-forward and feed-back filters 54, 52.

Further details of the invention depend on whether the channel is known at the receiver, partially known at the receiver, or unknown at the receiver. The known case determines the filter parameters using a fixed set of channel parameters, for example a known transfer function of a specific channel (wire, fiber optic, air, etc.). In the unknown case, the channel parameters are unknown, and the invention instead determines the filter parameters from the received data, using, for example, predetermined training symbols. In the partially-known case, an initial estimate of the channel parameters is used, and the iterative nature of the equalizer of the present invention is used to improve the channel estimate at the end of each pass. In each of the known, unknown and partially-known cases, during each pass, the feed-forward and feed-back filter parameters 50, 52 are modified.

Known Channel

When the channel is known at the receiver and P=Q=1, one possibility is to select the feed-forward filter $b^l[n]$ 50 and the feed-back filter $d^l[n]$ 52 during the l th pass to maximize the signal-to-interference+noise ratio (SINR) at the slicer input, in which case the discrete-time Fourier transforms of the feed-forward filter $b^l[n]$ 50 and the feed-back filter $d^l[n]$ 52 are respectively $$B^l(\omega) \propto \frac{A*(\omega)}{N_0 + \varepsilon_s(1 + (\rho_x^{l-1})^2)|A(\omega)|^2}$$

$$D^l(\omega) = \rho_x^{l-1}(A(\omega)B^l(\omega) - E[A(\omega)B^l(\omega)])$$

where $A(\omega)$ is the Fourier transform of the equivalent discrete-time baseband model of the PAM communication system, $\varepsilon_s$ is the energy of the transmitted symbols, $N_0$ is the variance of the additive noise due to the channel, $E[\cdot]$ is the expectation operator (alternatively, the expectation $E[\cdot]$ can be replaced by a frequency average $$\langle \cdot \rangle \triangleq \frac{1}{2\pi} \int_{-\pi}^{\pi} -d\omega ),$$

and $\rho_x^{l-1}$ is the normalized correlation between the transmitted data sequence $x[n]$ 59 and the previous set of tentative decisions made on the previous iteration $\tilde{x}^{l-1}[n]$ 60, i.e., $\rho_x^{l-1} \approx E[x^*[n] \cdot \tilde{x}^{l-1}[n]]/\varepsilon_s$. A possible method for computing the set of correlation coefficients $\rho_x^l$ in the special case of M-PSK data symbols is the following iterative technique:

1. Set $\rho_x^0 = 0$ and let l=1.
2. Compute the SINR $\gamma^l$ at the slicer 58 input on the l th decoding pass from $\rho_x^{l-1}$ via $$\gamma^l = \left( \frac{1}{\xi^l e^{\xi^l} E_1(\xi^l)} - 1 \right) \cdot \frac{1}{1 - (\rho_x^{l-1})^2}$$

where $$E_1(s) = \int_s^\infty e^{-t}/t \, dt$$

and $$\xi^l = N_0[\varepsilon_s \langle |A(\omega)|^2 \rangle (1 - (\rho_x^{l-1})^2)]^{-1}.$$

Optionally, $\gamma^l$ can be computed (and in some cases more accurately) from $\rho_x^{l-1}$ via $$\gamma^l = \frac{\varepsilon_s |\langle A(\omega)B^l(\omega) \rangle|^2}{N_0 \langle |B^l(\omega)|^2 \rangle + \varepsilon_s (1 - (\rho_x^{l-1})^2) \langle (A(\omega)B^l(\omega) - \langle A(\omega)B^l(\omega) \rangle)^2 \rangle}$$

3. Compute the normalized correlation coefficient $\rho_x^l$ between the symbols $x[n]$ and the decisions $\hat{x}^l[n]$ 59 generated at the slicer 58 via $$\rho_x^l = 1 - 2\sin^2\left(\frac{\pi}{M}\right) 2Q\left(\sin\left(\frac{\pi}{M}\right)\sqrt{2\gamma^l}\right)$$

where $$Q(v) \triangleq \frac{1}{\sqrt{2\pi}} \int_v^\infty e^{\frac{t^2}{2}} dt$$

4. Increment l and go to step 2.

Partially Known Channel

When the channel is partially known at the receiver, the performance of the receiver may become particularly sensitive to the accuracy of the channel estimate used by the equalizer. To prevent such sensitivity, the equalizer can be modified to use an estimate of the channel impulse parameters with some degree of uncertainty as opposed to a fixed estimate of the channel parameters (as in the known-channel case). When P=Q=1, one possibility is to use the techniques for the known-channel case described above, except that the fixed channel $A(\omega)$ is replaced by the channel estimate $\hat{A}(\omega)$, and the noise variance $N_0$ is replaced by $N^0 + \varepsilon_s \langle |A(\omega) - \hat{A}(\omega)|^2 \rangle$. Furthermore, it is possible to exploit the iterative nature of the equalizer to improve the channel estimate at the end of each pass, thus leading to a higher SINR in the slicer 58, which in turn lowers the probability of symbol error. At the end of the l th pass, the equalizer has knowledge of the received sequence $r[n]$ and the decisions $\hat{x}^l[n]$ of the current pass, for n=0, 1, . . . , N−1. For the purpose of estimating the channel impulse response $a[n]$, it may be assumed that $r[n]$ and $\hat{x}^l[n]$ are zero prior to n=0 and after n=N−1. Furthermore, for illustrative purposes, it is assumed here that $a[n]$ is nonzero for n=0, 1, . . . , N−1. If two vectors are defined $$\hat{a}^l = [\hat{a}^l[0]\hat{a}^l[1] \ldots \hat{a}^l[l-1]]^*$$

$$\hat{x}^l[n]\hat{x}^l[n]\hat{x}^l[n-1] \ldots \hat{x}^l[n-L+1]]^T$$

(where the superscript "*" denotes the conjugate-transpose operation for vectors and the conjugation operation for scalars, and where the superscript "T" denotes transposition), then the difference between the received data symbols and the response of the channel to the most recent set of decisions; i.e., $$\hat{\varepsilon}(\hat{a}^l) = \sum_{n=-\infty}^{\infty} |r[n] - \hat{a}^{l*}\hat{x}^l[n]|^2,$$

is minimized when $$\tilde{a}_{opt}^l = [\Phi^l]^{-1} u^l,$$

where $$\Phi^l = \sum_{n=-\infty}^{\infty} \hat{x}^l[n]\hat{x}^{l*}[n]$$

and $$u^l = \sum_{n=-\infty}^{\infty} r*[n]\hat{x}^l[n].$$

For M-PSK symbols, the variance of the error in the channel estimate $e^l[n]=a[n]-\hat{a}^l[n]$ made at the end of the l th pass is approximately $$(\sigma_e^l)^2 \approx \frac{2\langle |A(\omega)|^2 \rangle \varepsilon_s (1-\rho_x^l) + N_0}{N\varepsilon_s}$$

If, at the l th pass, the variance $(\sigma_e^{l-1})^2$ of the channel estimate made at the end of the previous pass is smaller than the variance of the channel estimate used for the (l−1) th pass, then the former should be used. If, on the other hand, the variance $(\sigma_e^{l-1})^2$ is larger than the variance of the channel estimate used for the (l−1) th pass, then the estimate used for the (l−1) th pass is used again for the l th pass.

Unknown Channel

When the channel is unknown at the receiver, an adaptive version of the present invention is required, in which optimal FIR filter coefficients are selected automatically (from the received data) without explicit knowledge of the channel characteristics.

The multipass equalizer of the present invention is designed to process received data in a block-iterative fashion, so it is ideally suited for packet communication in which the packet size is chosen small enough that the channel encountered by each packet appears linear time-invariant. As is typically the case with other adaptive equalizers, the adaptive iterated-decision equalizer makes use of training symbols sent along in the packet with the data symbols. Suppose that a block of white M-ary PSK symbols x[n] for n=0,1, . . . N−1 is transmitted; some of the symbols (not necessarily at the head of the packet) are for training, while the rest are data symbols.

The feed-forward filter $b^l[n]$ 50 and the feed-back filter $d^l[n]$ 52 for the l th iteration preferably comprise finite-length filters. Specifically, the feed-forward filter $b^l[n]$ 50 has $J_1$ strictly anticausal taps and $J_2$ strictly causal taps plus a center tap, while the feed-back filter $d^l[n]$ 52 has $K_1$ strictly anticausal taps and $K_2$ strictly causal taps with no center tap.

Prior to the first pass (l=1), the hard decisions $\hat{x}^0[n]$ are initialized. Since the locations and values of the training symbols in x[n] are known at the receiver, the hard decisions are initialized as $\hat{x}^0[n]=x[n]$ for the n corresponding to those locations. For all the other n between 0 and N−1 inclusive, $\hat{x}^0[n]$ is set to a "neutral" value; as an example, for white PSK symbols, this value should be zero.

On the l th pass of the equalizer where l=1, 2, 3, . . . the slicer 58 input $\tilde{x}^l[n]$ can be expressed as $$\tilde{x}^l[n]=c^{l*}q^l[n]$$

where $$c^l = \begin{bmatrix} b^l \\ -d^l \end{bmatrix} \quad q^l[n] = \begin{bmatrix} r[n] \\ \hat{x}^{l-1}[n] \end{bmatrix}$$

and $$b^l=[b^l[-J_1P] \ldots b^l[-P]b^l[0]b^l[P] \ldots b^l[J_2P]]*$$

$$d^l=[d^l[-K_1] \ldots d^l[-1]b^l[1] \ldots d^l[K_2]]*$$

$$r[n]=[r[nQ+J_1P] \ldots r[nQ+P]r[nQ]r[nQ-P] \ldots r[nQ-J_2P]]^T$$

$$\hat{x}^{l-1}[n]=[\hat{x}^{l-1}[n+K_1] \ldots \hat{x}^{l-1}[n+1]\hat{x}^{l-1}[n-1] \ldots \hat{x}^{l-1}[n-K_2]]^T.$$

Using, for example, a minimum-distance rule, the slicer 58 next generates the hard decisions $\hat{x}^l[n]$ from $\tilde{x}^l[n]$ for all n between 0 and N−1 inclusive, except for those n corresponding to the locations of training symbols in x[n]. For those n, the hard decisions are set to $\hat{x}^l[n]=x[n]$.

During the l th iteration, there are two sets of data available to the receiver: the received data r[n] and tentative decisions from the previous iteration $\hat{x}^{l-1}[n]$, n=0,1, . . . , N−1. If it is assumed that $x[n] \approx \hat{x}^{l-1}[n]$ for the purpose of determining the optimal filters (as is similarly done in the adaptive DFE in decision-directed mode), then it is reasonable to choose the feed-forward filter parameters $b^l[n]$ 50 and the feed-back back filter parameters $d^l[n]$ 52 so as to minimize the sum of error squares:

$$\varepsilon(c^l) = \sum_{n=-\infty}^{\infty} |\hat{x}^{l-1}[n] - c^{l*}q^l[n]|^2.$$

Since this is a linear least-squares estimation problem, the optimum $c^l$ is represented by:

$$c_{opt}^l = [\Phi^l]^{-1} u^l,$$

where $$\Phi^l = \sum_{n=-\infty}^{\infty} q^l[n]q^{l*}[n]$$

and $$u^l = \sum_{n=-\infty}^{\infty} \hat{x}^{l-1*}[n]q^l[n].$$

The resulting equalizer lends itself readily to practical implementation, even for large filter lengths. In particular, the matrix $\Phi^l$ can be efficiently computed using correlation functions involving r[n] and $\hat{x}^{l-1}[n]$. Specifically, if the following deterministic correlation functions are defined as:

$$\beta[n_1, n_2] = \sum_{k=-\infty}^{\infty} r[kQ-n_1]r*[kQ-n_2]$$

$$\theta^l[n] = \sum_{k=-\infty}^{\infty} \hat{y}^{l-1}[k]\hat{y}^{l-1*}[k-n]$$

-continued $$\Psi^l[n] = \sum_{k=-\infty}^{\infty} r[k]\hat{y}^{l-1^*}[k-n],$$

where $$\hat{y}^{l-1}[n] = \begin{cases} \hat{x}^{l-1}[n/Q], & n = 0, Q, 2Q, \ldots, (N-1)Q \\ 0, & \text{otherwise} \end{cases}$$

then $\Phi^l$ can be expressed as $$\Phi^l = \begin{bmatrix} \beta & \Psi^l \\ \Psi^{l^*} & \Theta^l \end{bmatrix}$$

where $$\beta = \begin{bmatrix} \beta[-J_1P, -J_1P] & \beta[-J_1P, -(J_1-1)P] & \ldots & \beta[-J_1P, J_2P] \\ \beta[-(J_1-1)P, -J_1P] & \beta[-(J_1-1)P, -(J_1-1)P] & \ldots & \beta[-(J_1-1)P, J_2P] \\ & & \ddots & \\ \beta[J_2P, -J_1P] & \beta[J_2P, -(J_1-1)P] & \ldots & \beta[J_2P, J_2P] \end{bmatrix}$$

$$\Theta^l = \begin{bmatrix} \theta^l[0] & \theta^l[Q] & \ldots & \theta^l[(K_1-1)Q] & \theta^l[(K_1+1)Q] & \ldots & \theta^l[(K_1+K_2)Q] \\ \theta^l[-Q] & \theta^l[0] & \ldots & \theta^l[(K_1-2)Q] & \theta^l[K_1Q] & \ldots & \theta^l[(K_1+K_2-1)Q] \\ \vdots & \vdots & \ddots & \vdots & \vdots & \ddots & \vdots \\ \theta^l[-(K_1-1)Q] & \theta^l[-(K_1-2)Q] & \ldots & \theta^l[0] & \theta^l[2Q] & \ldots & \theta^l[(K_2+1)Q] \\ \theta^l[-(K_1+1)Q] & \theta^l[-K_1Q] & \ldots & \theta^l[-2Q] & \theta^l[0] & \ldots & \theta^l[(K_2-1)Q] \\ \vdots & \vdots & \ddots & \vdots & \vdots & \ddots & \vdots \\ \theta^l[-(K_1+K_2)Q] & \theta^l[-(K_1+K_2-1)Q] & \ldots & \theta^l[-(K_2+1)Q] & \theta^l[-(K_2-1)Q] & \ldots & \theta^l[0] \end{bmatrix}$$

and $$\Psi^l = \begin{bmatrix} \psi^l[J_1P - K_1Q] & \psi^l[J_1P - (K_1-1)Q] & \ldots & \psi^l[J_1P - Q] & \psi^l[J_1P + Q] & \ldots & \psi^l[J_1P + K_2Q] \\ \psi^l[(J_1-1)P - K_1Q] & \psi^l[(J_1-1)P - (K_1-1)Q] & \ldots & \psi^l[(J_1-1)P - Q] & \psi^l[(J_1-1)P + Q] & \ldots & \psi[(J_1-1)P + K_2Q] \\ \vdots & \vdots & \ddots & \vdots & \vdots & \ddots & \vdots \\ \psi^l[-J_2P - K_1Q] & \psi^l[-J_2P - (K_1-1)Q] & \ldots & \psi^l[-J_2P - Q] & \psi^l[-J_2P + Q] & \ldots & \psi^l[-J_2P + K_2Q] \end{bmatrix}$$

Note that in general, none of the matrices $\beta$, $\Theta^l$, or $\Psi^l$ is Toeplitz. However, $\Theta^l$ is a $(K_1+K_2+1) \times (K_1+K_2+1)$ Toeplitz matrix with its $(K_1+1)$th row and $(K_1+1)$th column deleted, and $\beta$ exhibits cyclostationary properties with each diagonal having a period of Q. Moreover, depending on the values of P and Q, the matrix $\Psi^l$ may have a significant number of entries that have the same value. Thus, the special structure in $\Phi^l$ can be exploited so that the redundant computation of repeated entries is avoided. Furthermore, since $\Phi^l$ is a Hermitian matrix, it is only necessary to compute half of the distinct entries. In the special case of P=Q=1, $\beta$ is a Toeplitz matrix, and $\Psi^l$ can be thought of as originating from a $(J_1+J_2+1) \times (K_1+K_2+1)$ matrix with the elements on each diagonal being equal, but now with the $(K_1+1)$th column deleted. In this special case, the computation of $\Phi^l$ requires only $2(J_1+J_2+K_1+K_2+1)$ of the $(J_1+J_2+K_1+K_2+1)^2$ entries, as there are only that many distinct entries. If the total number of taps in the equalizer is 100, then the computation of $\Phi^l$ has been made approximately 50 times more efficient! The computation of $[\Phi^l]^{-1}$ can also be made more efficient. Specifically, since $\Phi^l$ can be expressed as a partitioned matrix in which $\beta$ and $\Theta^l$ are square, $[\Phi^l]^{-1}$ can be partitioned into $$[\Phi^l]^{-1} = \begin{bmatrix} \tilde{\beta}^l & \tilde{\Psi}^l \\ \tilde{\Psi}^{l^*} & \tilde{\Theta}^l \end{bmatrix}$$

where $\tilde{\beta}^l$, $\tilde{\Theta}^l$, and $\tilde{\Psi}^l$ have the same sizes as $\beta$, $\Theta$, and $\Psi^l$ respectively. Note that this takes advantage of the fact that the inverse of a Hermitian matrix is also Hermitian. Then, the matrices $\tilde{\beta}^l$, $\tilde{\Theta}^l$ and $\tilde{\Psi}^l$ can be computed either by the formulas $$\tilde{\beta}^l = (\beta - \Psi^l[\Theta^l]^{-1}\Psi^{l^t})^{-1}$$

$$\tilde{\Psi}^l = -(\beta - \Psi^l[\Theta^l]^{-1}\Psi^{l^t})^{-1} \cdot (\Psi^l[\Theta^l]^{-1})$$

$$\tilde{\Theta}^l = [\Theta^l]^{-1} + (\Psi^l[\Theta^l]^{-1})^t \cdot (\beta - \Psi^l[\Theta^l]^{-1}\Psi^{l^t})^{-1} \cdot (\Psi^l[\Theta^l]^{-1})$$

or by the equivalent formulas $$\tilde{\beta}^l = \beta^{-1} + (\beta^{-1}\Psi^l) \cdot (\Theta^l - \Psi^{l^t}\beta^{-1}\Psi^l)^{-1} \cdot (\beta^{-1}\Psi^l)^t$$

$$\tilde{\Psi}^l = -(\beta^{-1}\Psi^l) \cdot (\Theta^l - \Psi^{l^t}\beta^{-1}\Psi^l)^{-1}$$

$$\tilde{\Theta}^l = (\Theta^l - \Psi^{l^t}\beta^{-1}\Psi^l)^{-1}$$

(See H. Lütkepohl, *Handbook of Matrices*. Chichester, England: Wiley, 1996.) The factors within parentheses in the two above sets of equations indicate quantities that need to be computed only once for a given l. So if the first set of formulas is used, then $$[\Theta^l]^{-1}, (\beta - \Psi^l[\Theta^l]^{-1}\Psi^{l^t})^{-1}, \text{ and } (\beta - \Psi^l[\Theta^l]^{-1}\Psi^{l^t})^{-1} \cdot (\Psi^l[\Theta^l]^{-1})$$

should be computed in that order during each iteration. Similarly, if the second set is used, then $$\beta^{-1}, (\beta^{-1}\Psi^l), (\Theta^l - \Psi^{l*}\beta^{-1}\Psi^l)^{-1}, \text{ and } (\beta^{-1}\Psi^l) \cdot (\Theta^l - \Psi^{l*}\beta^{-1}\Psi^l)^{-1}$$

should be computed in that order during each iteration. In either case, the task of computing $[\Phi^l]^{-1}$ has been modified into a task involving the computation of an inverse matrix the size of $\beta$ and another inverse matrix the size of $\Theta^l$. One advantage of using the second set of formulas is that the same $\beta^{-1}$ is used during all iterations, so it only needs to be computed once during the whole multipass process. Thus, the only matrix inverse that needs to be computed during each iteration (except for the first iteration) is $$(\Theta^l - \Psi^{l*}\beta^{-1}\Psi^l)^{-1}.$$

and the original task of computing the inverse of a $(J_1+J_2+K_1+K_2+1) \times (J_1+J_2+K_1+K_2+1)$ matrix has been converted into a task involving the computation of the inverse of a $(K_1+K_2) \times (K_1+K_2)$ matrix. If $J_1$ is large, and $J_1=J_2=K_1=K_2$, then a reduction of computation by an order of magnitude is plausible. We now turn to a couple of implementation issues. First, when P=Q =1, the finite-length adaptive filters ideally approximate $$B^l(\omega) \propto \frac{A*(\omega)}{N_0 + \varepsilon_s(1 + (\rho_x^{l-1})^2)|A(\omega)|^2}$$

$$D^l(\omega) = \rho_x^{l-1}(A(\omega)B^l(\omega) - E[A(\omega)B^l(\omega)])$$

which are infinite in length. The optimal feed-forward filter $b^l[n]$ includes a filter matched to $a[n]$, and the optimal $d^l[n]$ includes a cascade of $a[n]$ and the corresponding matched filter, suggesting that a reasonable rule of thumb is to select $J_1, J_2, K_1, K_2$ such that each FIR filter covers twice the span of the channel impulse response. Second, the block-iterative nature of the equalizer allows the training symbols to be located anywhere in the packet. Since (in contrast to the DFE ) the locations do not appear to affect equalizer performance, the training symbols are arbitrarily chosen to have uniform spacing within each packet.

Error-Control Coding

In most communication systems, it is preferred to have the ability to apply error-control coding (ECC) to the data prior to modulation and transmission. Examples of error-control codes include block codes, convolutional codes, and trellis-coded modulation. The present invention includes two implementations of the equalizer that allow such coding to be explicitly taken into account at the receiver. In one version, equalization and error-correction decoding are performed separately. This implementation is obtained by processing the final decisions of the equalizer using a decoder placed after the equalizer in FIG. 2. In the other version, equalization and error-correction decoding are performed jointly, leading to much improved performance. This implementation is obtained by generalizing the iterative equalizer of FIG. 3 by coding the symbols $\hat{x}^{l-1}[n]$ using an error-correction encoder before being filtered in the feedback loop by $d^l[n]$, and by replacing the slicer depicted in FIG. 3 with an appropriate soft- or hard-decision error-correction decoder. For example, if trellis coding (see (a) G. Ungerboeck, "Channel coding with multilevel/phase signals," *IEEE Trans. Inform. Theory*, vol. IT-28, pp. 55--67, January 1982. (b) G. Ungerboeck, "Trellis-coded modulation with redundant signal sets Part I: Introduction," *IEEE Commun. Mag.*, vol. 25, pp. 5--11, February 1987. (c) G. Ungerboeck, "Trellis-coded modulation with redundant signal sets Part II: State of the art," *IEEE Commun. Mag.*, vol. 25, pp. 12--21, February 1987.) were employed, a classical soft-decision Viterbi decoder could be used in the resulting receiver. As another example, if turbo-type codes (see (a) C. Berrou, A. Glavieux, and P. Thitimajshima, "Near Shannon limit error-correcting coding and decoding: Turbo codes," in *Proc. Int. Conf. Commun.*, pp. 1064--1070, 1993. (b) C. Berrou and A. Glavieux, "Near optimum error correcting coding and decoding: turbo codes," *IEEE Trans. Commun.*, vol. 44, pp. 1261--1271, October 1996.) were used in conjunction with this equalizer, a doubly-iterative composite receiver could be used in which iterative turbo-decoding takes place in lieu of the slicer as a nested subsystem of the larger iterative equalizer structure.

Implementation for Transmitter Antenna Arrays

Figure 4:
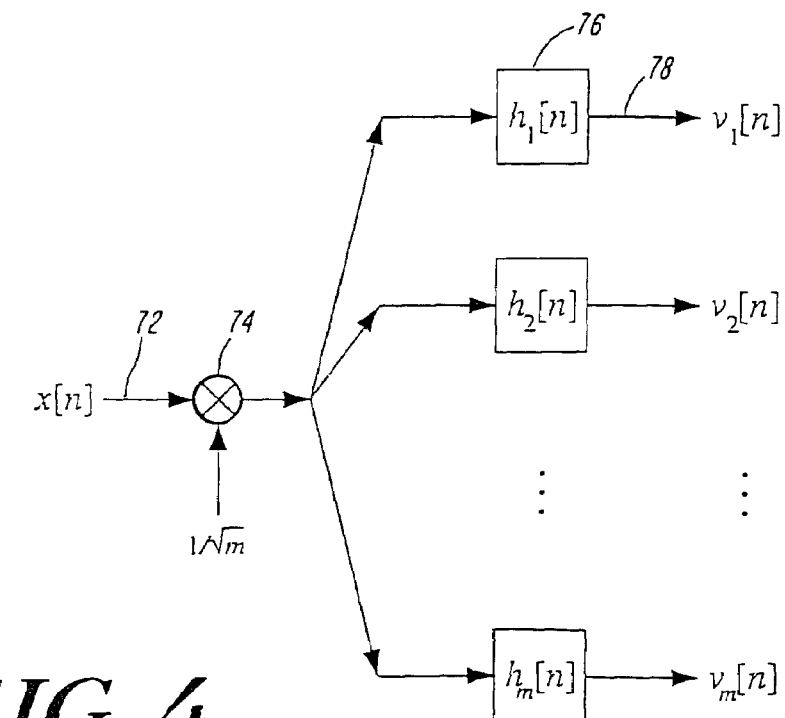
FIG. 4 is a block diagram of a transmitter that exploits spatial diversity, in accordance with the present invention.

Many communication systems, especially wireless ones, use a transmitter antenna array, whereby the data to be transmitted are sent from each of a set of different antenna elements. One possible transmitter structure which uses m antennas to exploit spatial diversity is depicted in FIG. 4 (see G. W. Wornell and M. D. Trott, "Efficient signal processing techniques for exploiting transmit antenna diversity on fading channels," *IEEE Trans. Signal Process.*, vol. 45, pp. 191--205, January 1997). For convenience the focus of the present discussion is on equivalent discrete-time baseband models. The symbol stream x[n] 72 is scaled down by a factor of $\sqrt{m}$ at scaler 74 and then processed by a linear precoder 76 at each of the constituent antennas of the transmitter to produce the transmitted symbol streams $v_1[n]$, $v_2[n], \ldots, v_m[n]$ 78.

Figure 5:
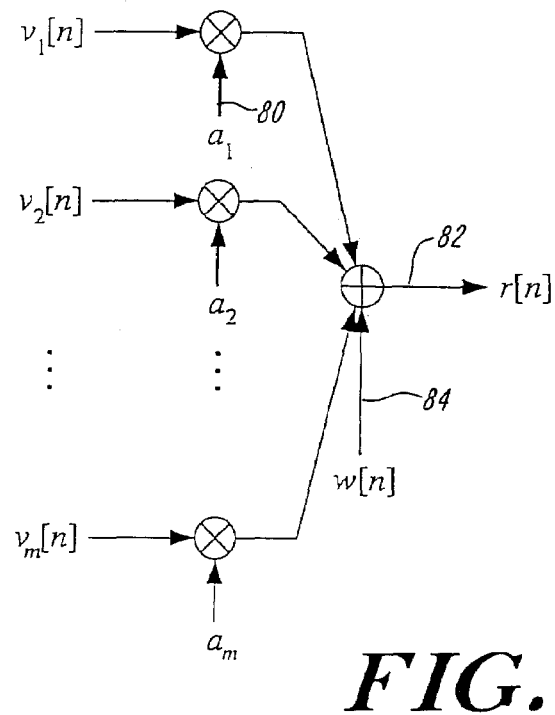
FIG. 5 is a block diagram of a fading channel model for a transmitter array, in accordance with the present invention.

The present invention includes an implementation of the block-iterative equalizer that is designed for use with a transmitter antenna array like the one described above. If the channel can be described by a nonselective fading model, shown in FIG. 5, then the signal at the receiver 82 can be modelled as $$r[n] = \sum_{i=1}^{m} a_i v_i[n] + w[n]$$

where w[n] 84 is additive noise and $a_1, a_2, \ldots, a_m$ 80 are fading coefficients. Alternatively, the received signal can be expressed in the form $$r[n] = \sum_k x[k]a[n-k] + w[n]$$

where $$a[n] = \frac{1}{\sqrt{m}} \sum_{i=1}^{m} a_i h_i[n]$$

is the impulse response of the "effective" channel generated by the antenna precoder. The channel has a frequency response of $$A(\omega) = \frac{1}{\sqrt{m}} \sum_{i=1}^{m} a_i H_i(\omega),$$

so the antenna precoding effectively transforms the original nonselective fading channel into a frequency-selective fading channel, and the implementation of the block-iterative equalizer corresponding to FIG. 3 and described above is applicable. As discussed above, specific details of the implementation depend on whether the "effective" channel is known, partially known, or unknown.

Multichannel Implementation

In many communication systems, especially wireless ones, multiple copies of the transmitted waveform are received, each being distorted differently. Such is the case, for example, when the transmission is received by a multiple element array. In such cases, it is common to use an equalizer with what is referred to as a multichannel implementation for jointly processing the received streams. For such applications, the present invention includes an efficient multichannel implementation of the block-iterative equalizer, which can enhance performance over the single channel implementation.

Figure 6:
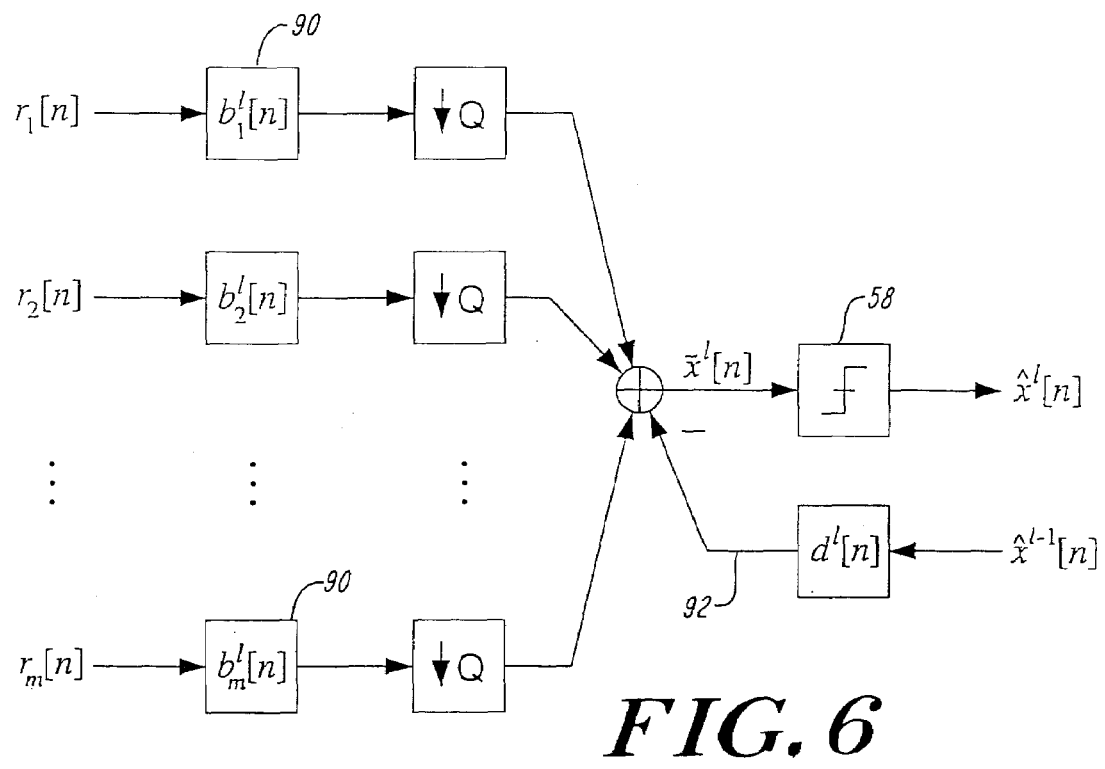
FIG. 6 is a block diagram of an equalizer embodying the principles of a multichannel implementation in accordance with the present invention.

The structure of a multichannel, fractionally spaced iterated-decision equalizer is depicted in FIG. 6. For each of the m channels, the equalizer receives a signal that is typically modelled as $$r_i[n] = \sum_k x[k] a_i[n-k] + w_i[n] \quad \text{for} \quad i = 1, 2, \ldots, m$$

where x[n] is the sequence of transmitted symbols, $a_i[n]$ is the equivalent discrete-time baseband model of the i th channel, and $w_i[n]$ is the additive noise of the i th channel. Therefore, in this embodiment, the main difference in the equalizer is that instead of one fractionally-spaced feedforward filter, there are now m such filters 90. The operation of the equalizer remains essentially the same, except that the output of the feedback branch 92 is now subtracted from the sum of the feedforward branch outputs, rather than from just a single feedforward branch output.

If the multiple channels are unknown at the receiver, the technique employed in the single channel case can be generalized. Thus, the slicer input $\tilde{x}^l[n]$ can be expressed in vector form as $$\tilde{x}^l[n] = c^{l*} q^l[n]$$

where $$c^l = \begin{bmatrix} b_1^l \\ b_2^l \\ \vdots \\ b_m^l \\ -d^l \end{bmatrix} \quad q^l[n] = \begin{bmatrix} r_1[n] \\ r_2[n] \\ \vdots \\ r_m[n] \\ \hat{x}^{l-1}[n] \end{bmatrix}$$

and $$b_i^l = [b_i^l[-J_1 P] \ldots b_i^l[-P] b_i^l[0] b_i^l[P] \ldots b_i^l[J_2 P]]^*$$

$$d^l = [d^l[-K_1] \ldots d^l[-1] d^l[1] \ldots d^l[K_2]]^*$$

$$r_i[n] = [r_i[nQ+J_1 P] \ldots r_i[nQ+P] r_i[nQ] r_i[nQ-P] \ldots r_i[nQ-J_2 P]]^T$$

$$\hat{x}^{l-1}[n] = [\hat{x}^{l-1}[n+K_1] \ldots \hat{x}^{l-1}[n+1] \hat{x}^{l-1}[n-1] \ldots \hat{x}^{l-1}[n-K_2]]^T.$$

If $b_1^l[n], b_2^l[n], \ldots, b_m^l[n]$, and $d^l[n]$ are chosen so as to minimize the sum of error squares:

$$\varepsilon(c^l) = \sum_{n=-\infty}^{\infty} \left| \hat{x}^{l-1}[n] - c^{l*} q^l[n] \right|^2$$

then the optimum $c^l$ is $$c_{opt}^l = [\Phi^l]^{-1} u^l,$$

where $$\Phi^l = \sum_{n=-\infty}^{\infty} q^l[n] q^{l*}[n]$$

and $$u^l = \sum_{n=-\infty}^{\infty} \hat{x}^{l-1*}[n] q^l[n].$$

The computation of the matrix $\Phi^l$ can be made more efficient by first defining the following deterministic correlation functions $$\beta_{ij}[n_1, n_2] = \sum_{k=-\infty}^{\infty} r_i[kQ - n_1] r_j^*[kQ - n_2]$$

$$\theta^l[n] = \sum_{k=-\infty}^{\infty} \hat{y}^{l-1}[k] \hat{y}^{l-1*}[k-n]$$

$$\psi_i^l[n] = \sum_{k=-\infty}^{\infty} r_i[k] \hat{y}^{l-1*}[k-n], \quad \text{where}$$

$$\hat{y}^{l-1}[n] = \begin{cases} \hat{x}^{l-1}[n/Q], & n = 0, Q, 2Q, \ldots, (N-1)Q \\ 0, & \text{otherwise} \end{cases}$$

Thus, for m channels, the matrix $\Phi^l$ may be rewritten as $$\Phi^l = \begin{bmatrix} \beta_{11} & \beta_{12} & \cdots & \beta_{1m} & \Psi_1^l \\ \beta_{12}^* & \beta_{22} & \cdots & \beta_{2m} & \Psi_2^l \\ \vdots & \vdots & \ddots & \vdots & \vdots \\ \beta_{1m}^* & \beta_{2m}^* & \cdots & \beta_{mm} & \Psi_m^l \\ \Psi_1^{l*} & \Psi_2^{l*} & \cdots & \Psi_m^{l*} & \Theta^l \end{bmatrix}$$

where $$\beta_{ij} = \begin{bmatrix} \beta_{ij}[-J_1P, -J_1P] & \beta_{ij}[-J_1P, -(J_1-1)P] & \cdots & \beta_{ij}[-J_1P, J_2P] \\ \beta_{ij}[-(J_1-1)P, -J_1P] & \beta_{ij}[-(J_1-1)P, -(J_1-1)P] & \cdots & \beta_{ij}[-(J_1-1)P, J_2P] \\ \vdots & \vdots & \ddots & \vdots \\ \beta_{ij}[J_2P, -J_1p] & \beta_{ij}[J_2P, -(J_1-1)P] & \cdots & \beta_{ij}[J_2P, J_2P] \end{bmatrix}$$

$$\Theta^l = \begin{bmatrix} \theta^l[0] & \theta^l[Q] & \cdots & \theta^l[(K_1-1)Q] & \theta^l[(K_1+1)Q] & \cdots & \theta^l[(K_1+K_2)Q] \\ \theta^l[-Q] & \theta^l[0] & \cdots & \theta^l[(K_1-2)Q] & \theta^l[K_1Q]_1 & \cdots & \theta^l[(K_1+K_2-1)Q] \\ \vdots & \vdots & \ddots & \vdots & \vdots & \ddots & \vdots \\ \theta^l[-(K_1-1)Q] & \theta^l[-(K_2-2)Q] & \cdots & \theta^l[0] & \theta^l[2Q] & \cdots & \theta^l[(K_2+1)Q] \\ \theta^l[-(K_1+1)Q] & \theta^l[-K_1Q] & \cdots & \theta^l[2Q] & \theta^l[0] & \cdots & \theta^l[(K_2-1)Q] \\ \vdots & \vdots & \ddots & \vdots & \vdots & \ddots & \vdots \\ \theta^l[-(K_1+K_2)Q] & \theta^l[-(K_1+K_2-1)Q] & \cdots & \theta^l[-(K_2+1)Q] & \theta^l[-(K_2-1)Q] & \cdots & \theta^l[0] \end{bmatrix}$$

and $$\Psi_i^l = \begin{bmatrix} \psi_i^l[J_1P - K_1Q] & \psi_i^l[J_1P - (K_1-1)Q] & \cdots & \psi_i^l[J_1P - Q] & \psi_i^l[J_1P + Q] & \cdots & \psi_i^l[J_1P + K_2Q] \\ \psi_i^L[(J_1-1)P - K_1Q] & \psi_i^l[(J_1-1)P - (K_1-1)Q] & \cdots & \psi_i^l[(J_1-1)P - Q] & \psi_i^l[(J_1-1)P + Q] & \cdots & \psi_i^l[(J_1-1)P + K_2Q] \\ \vdots & \vdots & \ddots & \vdots & \vdots & \ddots & \vdots \\ \psi_i^l[-J_2P - K_1Q] & \psi_i^l[-J_2P - (K_1-1)Q] & \cdots & \psi_i^l[-J_2P - Q] & \psi_i^l[-J_2P + Q] & \cdots & \psi_i^l[-J_2P + K_2Q] \end{bmatrix}.$$

Note that in general, none of the matrices $\beta_{ij}$, $\Theta^l$, or $\Psi_i^l$ is Toeplitz. However, $\Theta^l$ is a $(K_1+K_2+1) \times (K_1+K_2+1)$ Toeplitz matrix with its $(K_1+1)$th row and $(K_1+1)$th column deleted, and $\beta_{ij}$ exhibits cyclostationary properties with each diagonal having a period of Q. Moreover, depending on the values of P and Q, the matrix $\Psi_i^l$ may have a significant number of entries that have the same value. Thus, the special structure in $\Phi^l$ can be exploited so that the redundant computation of repeated entries is avoided. Furthermore, since $\Phi^l$ is a Hermitian matrix, it is only necessary to compute half of the distinct entries.

As in the single-channel case, the computation of $[\Phi^l]^{-1}$ for the multichannel equalizer can be made more efficient by partitioning $\Phi^l$ into four submatrices such that the upper left and lower right submatrices are square, and then applying the formulas for the inverse of a partitioned matrix. Since these formulas involve computing the inverses of two matrices with the same sizes as the upper left and lower right submatrices, it is usually best to partition $\Phi^l$ into submatrices of approximately the same size so that computation of a large matrix inverse is avoided.

Multiuser Implementation

The present invention further comprises a block-iterative multiuser equalizer that jointly takes into account multiple-access, co-channel, and extra-network interference, which are generally experienced in communication networks, especially wireless networks. For multiple-access interference in particular, the invention jointly suppresses intersymbol and multiple-access interference in a manner generalizing the structure of FIG. 3.

The signal at the receiver is typically modelled as $$r[n] = \sum_{i=1}^{p} \sum_{k} x_i[k] a_i[n-k] + w[n]$$

where p is the number of users, $x_i[n]$ is the sequence of symbols transmitted by the i th user, $a_i[n]$ is the equivalent discrete-time baseband model of the channel encountered by the $i_{th}$ user, and w[n] represents additive noise and interference.

Figure 7:
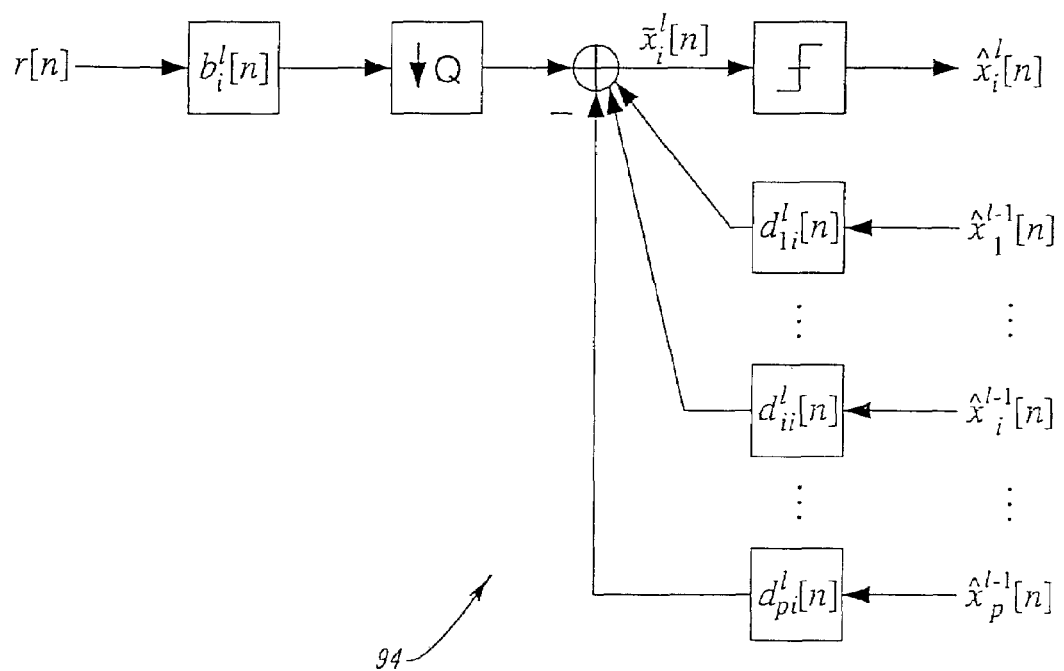
FIG. 7 is a block diagram of an equalizer embodying the principles of a multiuser implementation in accordance with the present invention.

The multiuser, fractionally spaced iterated-decision equalizer consists of p main branches, with each branch designed to decode the symbol stream of a different user. The structure of the i th branch, shown in FIG. 7, is similar to the single-user equalizer shown in FIG. 3 except that the present embodiment includes an additional p-1 feedback loops 94 to cancel multiple-access interference caused by the other p-1 users. Because each branch requires access to the tentative decisions made in the previous iteration for all p users (i.e., each branch requires access to $\hat{x}_1^{l-1}[n], \hat{x}_2^{l-1}[n], \ldots, \hat{x}_p^{l-1}[n]$), all branches must complete the (l-1) th iteration before any branch proceeds to the l th iteration.

If the channels are unknown at the receiver, the approach for the single-user case can be generalized for the multiple-user case. Thus, for the i th user, the slicer input $\tilde{x}_i^l[n]$ can be expressed in vector form as $$\tilde{x}_i^l[n] = c_i^{l*} q_i^l[n]$$

where $$c_i^l = \begin{bmatrix} b_i^l \\ -d_{1i}^l \\ \vdots \\ -d_{ii}^l \\ \vdots \\ -d_{pi}^l \end{bmatrix} \quad q_i^l[n] = \begin{bmatrix} r[n] \\ \hat{x}_1^{l-1}[n] \\ \vdots \\ \hat{x}_i^{l-1}[n] \\ \vdots \\ \hat{x}_p^{l-1}[n] \end{bmatrix}$$

and $$b_i^l = [b_i^l[-J_1P] \ldots b_i^l[-P] \; b_i^l[0] \; b_i^l[P] \ldots b_i^l[J_2P]]^*$$

$$d_{ji}^l = \begin{cases} [d_{ji}^l[-K_1] \ldots d_{ji}^l[-1] \; d_{ji}^l[1] \ldots d_{ji}^l[K_2]]^*, & \text{if } j = i \\ [d_{ji}^l[-K_1] \ldots d_{ji}^l[-1] \; d_{ji}^l[0] \; d_{ji}^l[1] \ldots d_{ji}^l[K_2]]^*, & \text{if } j \neq i \end{cases}$$

$$r[n] = [r[nQ+J_1P] \ldots r[nQ+P] \; r[nQ] \; r[nQ-P] \ldots r[nQ-J_2P]]^T$$

$$\hat{x}_j^{l-1}[n] =$$

$$\begin{cases} [\hat{x}_j^{l-1}[n+K_1] \ldots \hat{x}_j^{l-1}[n+1] \; \hat{x}_j^{l-1}[n-1] \ldots \hat{x}_j^{l-1}[n-K_2]]^T, \\ \text{if } j = i \\ [\hat{x}_j^{l-1}[n+K_1] \ldots \hat{x}_j^{l-1}[n+1] \; \hat{x}_j^{l-1}[n] \; \hat{x}_j^{l-1}[n-1] \ldots \hat{x}_j^{l-1}[n-K_2]]^T, \\ \text{if } j \neq i \end{cases}$$

where j=1,2, . . . p. If $b_i^l[n]$, $d_{1i}^l[n]$, $d_{2i}^l[n]$, . . . $d_{pi}^l[n]$ are chosen so as to minimize the sum of error squares:

$$\varepsilon(c_i^l) = \sum_{n=-\infty}^{\infty} |\hat{x}_i^{l-1}[n] - c_i^{l*} q_i^l[n]|^2,$$

then the optimum $c_i^l$ for the i th user is $$c_{i,opt}^l = [\Phi_i^l]^{-1} u_i^l,$$

where $$\Phi_i^l = \sum_{n=-\infty}^{\infty} q_i^l[n] q_i^{l*}[n]$$

and $$u_i^l = \sum_{n=-\infty}^{\infty} \hat{x}_i^{l-1*}[n] q_i^l[n].$$

Joint Transmitter and Receiver Design

The present invention is further directed to an embodiment in which the transmitter has available at least partial information about the channel state (for example, via a low-delay feedback path from receiver to transmitter). In this situation, significant performance enhancements can be achieved. For example, if the transmitter has exact knowledge of the channel characteristics, part of the equalization can be performed at the transmitter so that noise enhancement and/or error propagation can be avoided. This idea is analogous to Tomlinson-Harashima preceding; see (a) M. Tomlinson, "New automatic equalizer employing modulo arithmetic," *Electon. Lett.*, vol. 7, pp. 138--139, March 1971. (b) H. Miyakawa and H. Harashima, "A method of code conversion for a digital communication channel with intersymbol interference," *Trans. Inst. Electron. Commun. Eng. Japan*, vol 52-A, pp. 272--273, June 1969. (c) H. Harashima and H. Miyakawa, "Matched-transmission technique for channel with intersymbol interference," *IEEE Trans. Commun.*, vol. COM-20, pp. 774--780, August 1972.

While this invention has been particularly shown and described with references to preferred embodiments thereof, it will be understood by those skilled in the art that various changes in form and details may be made therein without departing from the spirit and scope of the invention as defined by the appended claims.

For example the first and second filters specified above may comprise linear, non-linear, time-variant, time-invariant, infinite-impulse response, and finite impulse response filters. Although the above description of the preferred embodiment of the present invention pertains to equalization of digital signals, the principles of the present invention apply equally well to equalization of analog signals, using, for example, analog equivalents of the first and second filters, the combiner, and the slicer.

We claim:

1. An iterative equalizer for a data communication system for recovering received data transmitted over a data channel comprising:
    a first linear filter for filtering a block of received data according to first filter parameters to generate first-filtered data;
    a combiner for modifying the first-filtered data with second-filtered data to generate modified data;
    a decision device for generating modified tentative decisions on all data in the block based on the modified data, the modified tentative decisions being modified with respect to tentative decisions of a previous iteration, said modified tentative decisions being used to subtract out an estimate of the intersymbol interference; and
    a second linear filter for causally and anticausally filtering said block of tentative decisions from a previous pass according to second filter parameters to generate said second-filtered data so as to produce an estimate of the intersymbol interference;
    wherein said received block of data is filtered more than once by multiple non-simultaneous passes though the data, each pass comprising both a first filter and a second filter and said first and second filter parameters are based on the received data and the intersymbol interference is removed from said modified data in a nonlinear manner.

2. The equalizer of claim 1 wherein the first and second filter parameters are modified at each iteration.

3. The equalizer of claim 1 wherein the equalizer is fractionally-spaced in that the received data is sampled at a rate higher than a symbol rate associated with the received data.

4. The equalizer of claim 1 wherein the received data comprises symbol data.

5. The equalizer of claim 1 wherein the first and second filter parameters are modified at each iteration according to channel parameters that are re-estimated at each iteration based on the received data.

6. The equalizer of claim 1 wherein the received data is encoded for error-correction coding, and wherein the decision device comprises an error-correction decoder and further comprising an encoder for error-correction encoding the tentative decisions from a previous iteration.

7. The equalizer of claim 1 wherein the first and second filters comprise filter types selected from the group of filter types consisting of: time-variant, time-invariant, infinite-impulse-response, and finite-impulse-response filters.

8. The equalizer of claim 1 wherein the received data comprises a plurality of received signals received over a plurality of said data channels, and wherein the equalizer further comprises a like plurality of said first filters corresponding to the plurality of channels.

9. The equalizer of claim 1 wherein the received data comprises combined data for a plurality of users, and wherein the equalizer further comprises a like plurality of said second filters corresponding to the plurality of users.

10. The equalizer of claim 1 wherein the first filter, combiner, decision device and second filter are distributed among a data channel transmitter and receiver.

11. An iterative equalizer for a data communication system for recovering received data transmitted over a data channel having channel parameters comprising:

a first linear filter for filtering a block of received data according to first filter parameters to generate first-filtered data;

a combiner for modifying the first-filtered data with second-filtered data to generate modified data;

a decision device for generating modified tentative decisions on all data in the block based on the modified data, the modified tentative decisions being modified with respect to tentative decisions of a previous iteration said modified tentative decisions being used to subtract out an estimate of the intersymbol interference; and a second linear filter for causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, and wherein the received data is encoded for error-correction coding, and wherein the decision device comprises an error-correction decoder and further comprising an encoder for error-correction encoding said tentative decisions from a previous iteration so that intersymbol interference is removed from said modified data in a nonlinear manner.

12. The equalizer of claim 11 wherein said first and second filter parameters are modified at each iteration.

13. An iterative equalizer for a data communication system for recovering received data transmitted over a plurality of data channels comprising:

a first linear filter for filtering received a block of data according to first filter parameters to generate first-filtered data;

a combiner for modifying the first-filtered data with second-filtered data to generate modified data;

a decision device for generating modified tentative decisions on all data in the block based on the modified data, the modified tentative decisions being modified with respect to tentative decisions of a previous iteration said modified tentative decisions being used to subtract out an estimate of the intersymbol interference; and a second linear filter for causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, and wherein the received data comprises a plurality of received signals received over the plurality of data channels, and wherein the equalizer further comprises a like plurality of said first filters corresponding to the plurality of channels so that intersymbol interference is removed from said modified data in a nonlinear manner.

14. The equalizer of claim 13 wherein said first and second filter parameters are modified at each iteration.

15. An iterative equalizer for a data communication system for recovering received data transmitted over a data channel comprising:

a first linear filter for filtering a block of received data according to first filter parameters to generate first-filtered data;

a combiner for modifying the first-filtered data with second-filtered data to generate modified data;

a decision device for generating modified tentative decisions on all data in the block based on the modified data, the modified tentative decisions being modified with respect to tentative decisions of a previous iteration, said modified tentative decisions being used to subtract out an estimate of the intersymbol interference; and a second linear filter for causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, and wherein the equalizer is fractionally spaced in that the received data is sampled at a rate higher than a symbol rate associated with the received data so that intersymbol interference is removed from said modified data in a nonlinear manner.

16. The equalizer of claim 15 wherein said first and second filter parameters are modified at each iteration.

17. A method for recovering received data transmitted over a data channel in a data communication system comprising iteratively:

first-filtering a block of received data according to first filter parameters to generate first-filtered data;

modifying the first-filtered data with second-filtered data to generate modified data;

generating modified tentative decisions on all data in the block based on the modified data, the modified tentative decisions being modified with respect to tentative decisions of a previous iteration, said modified tentative decisions being used to subtract out an estimate of the intersymbol interference; and causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on the received data so that intersymbol interference is removed from said modified data in a nonlinear manner.

18. The method of claim 17 further comprising modifying the first and second filter parameters at each iteration.

19. The method of claim 17 wherein the received data is sampled at a rate higher than a sample rate associated with the received data.

20. The method of claim 17 wherein the received data comprises symbol data.

21. The method of claim 17 further comprising modifying the first and second filter parameters at each iteration according to channel parameters that are re-estimated at each iteration based on the received data.

22. The method of claim 17 wherein the received data is encoded for error-correction coding, and wherein generating modified tentative decisions based on the modified data comprises error-correction decoding the modified data and further comprising error-correction encoding the tentative decisions from a previous iteration.

23. The method of claim 17 wherein the first and second filters comprise filter types selected from the group of filter types consisting of: non-linear, time-variant, time-invariant, infinite-impulse-response, and finite-impulse-response filters.

24. The method of claim 17 wherein the received data comprises a plurality of received signals received over a plurality of said data channels, and further comprising first-filtering the received data at a plurality of first filters corresponding to the plurality of channels.

25. The method of claim 17 wherein the received data comprises combined data for a plurality of users, and further comprising second-filtering the tentative decisions from a previous iteration at a plurality of second filters corresponding to the plurality of users.

26. The method of claim 17 wherein the first filter, combiner, decision device and second filter are distributed among a data channel transmitter and receiver.

27. A method for recovering received data transmitted over a data channel having channel parameters, in a data communication system, comprising iteratively:

first-filtering a block of received data according to first filter parameters to generate first-filtered data;

modifying the first-filtered a block of data with second-filtered data to generate modified data;

generating modified tentative decisions on all data in the block based on the modified data, the modified tentative decisions being modified with respect to tentative decisions of a previous iteration, said modified tentative decisions being used to subtract out an estimate of the intersymbol interference; and causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, and wherein the received data is encoded for error-correction coding, and wherein generating modified tentative decisions based on the modified data comprises error-correction decoding the modified data and further comprising error-correction encoding the tentative decisions from a previous iteration so that intersymbol interference is removed from said modified data in a nonlinear manner.

28. The method of claim 27 further comprising modifying the first and second filter parameters at each iteration.

29. A method for recovering received data transmitted over a plurality of data channels having channel parameters, in a data communication system, comprising iteratively:

first-filtering a block of received data according to first filter parameters to generate first-filtered data;

modifying the first-filtered data with second-filtered data to generate modified data;

generating modified tentative decisions on all data in the block based on the modified data, the modified tentative decisions being modified with respect to tentative decisions of a previous iteration, said modified tentative decisions being used to subtract out an estimate of the intersymbol interference; and causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, wherein the received data comprises a plurality of received signals received over the plurality of data channels, and further comprising first-filtering the received data at a plurality of first filters corresponding to the plurality of channels so that intersymbol interference is removed from said modified data in a nonlinear manner.

30. The method of claim 29 further comprising modifying the first and second filter parameters at each iteration.

31. A method for recovering received data transmitted over a data channel having channel parameters, in a data communication system, comprising iteratively:

first-filtering a block of received data according to first filter parameters to generate first-filtered data;

modifying the first-filtered data with second-filtered data to generate modified data;

generating modified tentative decisions on all data in the block based on the modified data, the modified tentative decisions being modified with respect to tentative decisions of a previous iteration, said modified tentative decisions being used to subtract out an estimate of the intersymbol interference; and causally and anticausally filtering said block of tentative decisions from a previous pass according to second filter parameters to generate said second-filtered data so as to produce an estimate of the intersymbol interference;

wherein said received block of data is filtered more than once by multiple non-simultaneous passes through the data, each pass comprising both a first filter and a second filter and said first and second filter parameters are based on an estimate of said channel parameters, and wherein the received data is sampled at a rate higher than a symbol rate associated with the received data so that intersymbol interference is removed from said modified data in a nonlinear manner.

32. The method of claim 31 further comprising modifying the first and second filter parameters at each iteration.

* * * * *